(12) United States Patent
Wiedmann et al.

(10) Patent No.: US 9,482,291 B2
(45) Date of Patent: Nov. 1, 2016

(54) PRIME MOVER ARRANGEMENT COMPRISING A FLUID-ACTUATED CLUTCH ARRANGEMENT AND A MULTI-DISK CLUTCH

(71) Applicant: Robert Bosch GmbH, Stuttgart (DE)

(72) Inventors: Felix Wiedmann, Stuttgart (DE); Andreas Wengert, Backnang (DE); Nadja Eisenmenger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/386,953

(22) PCT Filed: Mar. 19, 2013

(86) PCT No.: PCT/EP2013/055692
§ 371 (c)(1),
(2) Date: Sep. 22, 2014

(87) PCT Pub. No.: WO2013/139790
PCT Pub. Date: Sep. 26, 2013

(65) Prior Publication Data
US 2015/0083545 A1 Mar. 26, 2015

(30) Foreign Application Priority Data
Mar. 20, 2012 (DE) .................. 10 2012 204 369

(51) Int. Cl.
*F16D 25/0638* (2006.01)
*F16D 25/08* (2006.01)
*F02B 73/00* (2006.01)

(52) U.S. Cl.
CPC ............ *F16D 25/087* (2013.01); *F02B 73/00* (2013.01); *F16D 25/0638* (2013.01); *F16D 25/08* (2013.01)

(58) Field of Classification Search
CPC .................. F16D 41/04; F16D 47/04; F16D 25/00–25/088; F02B 73/00; F02G 5/02–5/04
See application file for complete search history.

(56) References Cited

U.S. PATENT DOCUMENTS 2,009,301 A * 7/1935 Rode ............... F16D 67/02
100/214
3,900,089 A 8/1975 Ivey
(Continued)

FOREIGN PATENT DOCUMENTS

DE 10045758 3/2002
DE 102008043484 11/2009
(Continued)

OTHER PUBLICATIONS

International Search Report for Application No. PCT/EP2013/055692 dated Jul. 30, 2013 (English Translation, 2 pages).

*Primary Examiner* — Richard Lorence
(74) *Attorney, Agent, or Firm* — Michael Best & Friedrich LLP

(57) ABSTRACT

The invention relates to a prime mover arrangement comprising an internal combustion engine (1) for driving a first shaft (2) and comprising a steam engine (4) which is connected to the first shaft by means of a clutch arrangement (3) for driving a second shaft (5). Furthermore, means which interact with the clutch arrangement (3) are arranged between the first shaft (2) and the second shaft (5) in order to transmit a rotational movement of the second shaft (5) to the first shaft (2) in a first operating mode and to allow a freewheel between the first shaft (2) and the second shaft (5) in a second operating mode. The clutch arrangement (3) can be operated with positive pressure or negative pressure. Furthermore, the clutch arrangement (3) can be shifted by a fluid, and a torque transmission is provided between the first shaft (2) and the second shaft (5).

11 Claims, 3 Drawing Sheets

(56) References Cited

U.S. PATENT DOCUMENTS

| | | | | |
|---|---|---|---|---|
| 4,007,594 A | * | 2/1977 | Elsea, Jr. | F01K 23/14 |
| | | | | 192/223 |
| 5,038,904 A | | 8/1991 | Miller | |
| 9,080,658 B2 | * | 7/2015 | Eisenmenger | F16D 27/11 |
| 2010/0101228 A1 | | 4/2010 | Bartosch et al. | |
| 2010/0304912 A1 | | 12/2010 | Sime | |
| 2015/0075942 A1 | * | 3/2015 | Wiedmann | F16D 25/0635 |
| | | | | 192/41 R |

FOREIGN PATENT DOCUMENTS

| | | |
|---|---|---|
| DE | 102010031498 | 1/2012 |
| GB | 920701 | 3/1963 |
| WO | 2012010372 | 1/2012 |

* cited by examiner

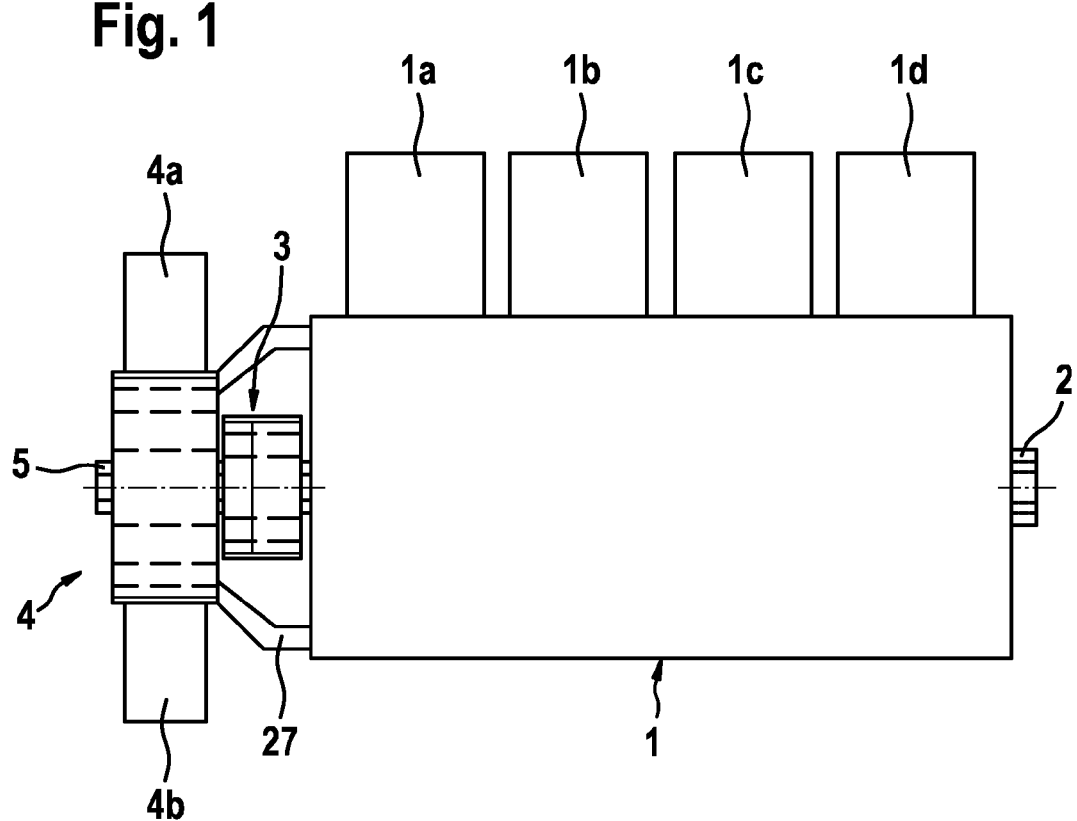

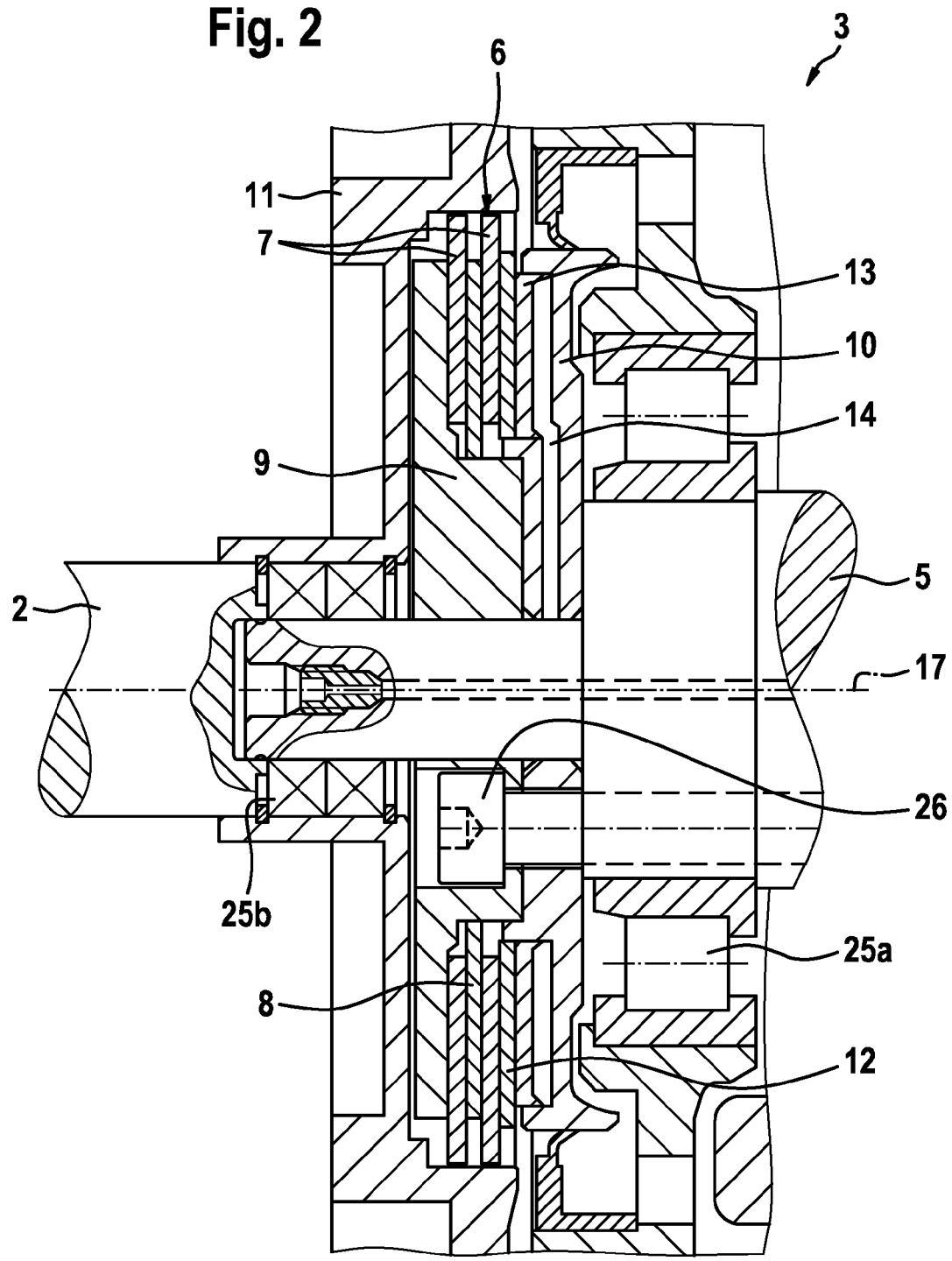

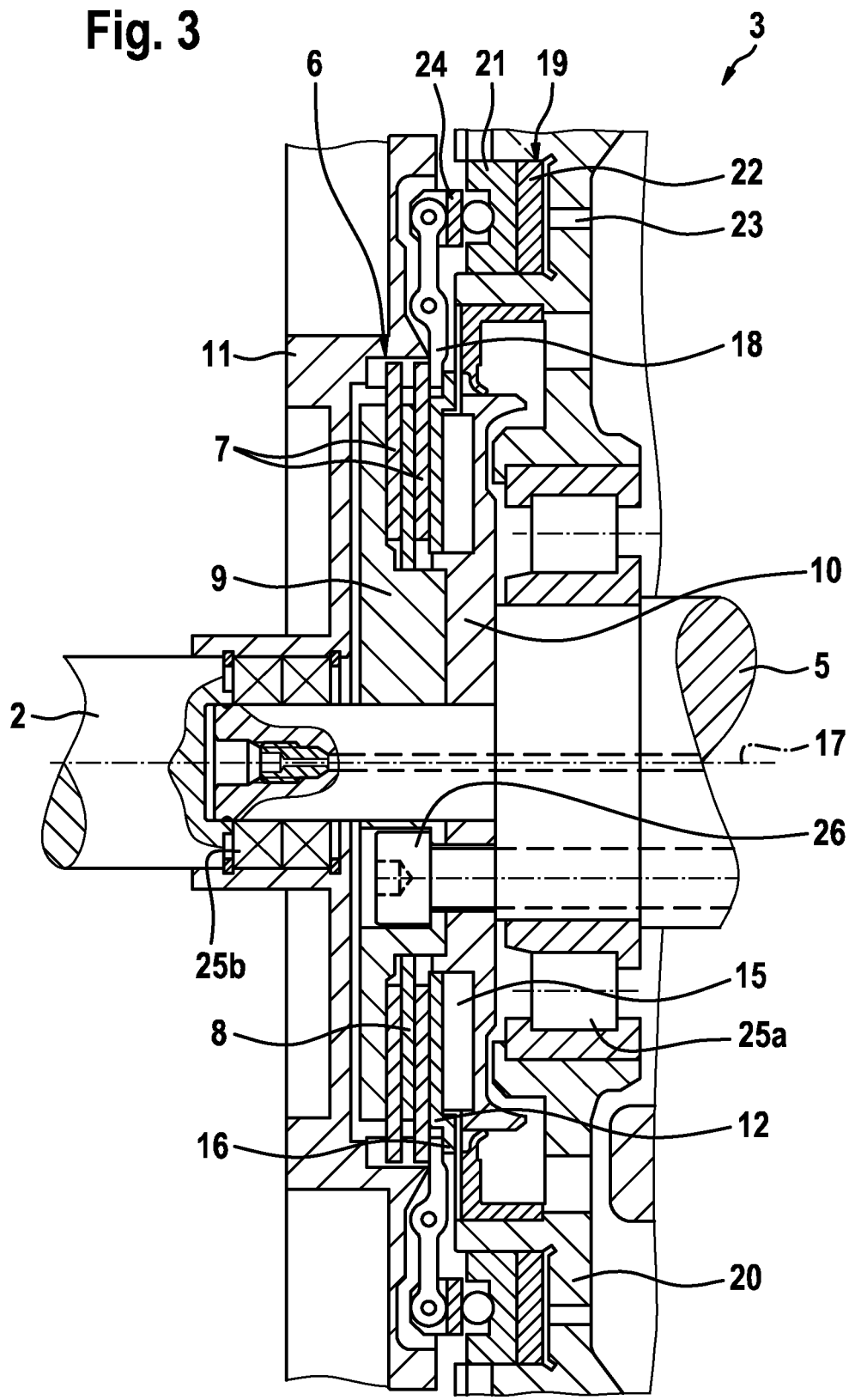

PRIME MOVER ARRANGEMENT COMPRISING A FLUID-ACTUATED CLUTCH ARRANGEMENT AND A MULTI-DISK CLUTCH

BACKGROUND OF THE INVENTION

The present invention relates to a prime mover arrangement comprising an internal combustion engine for driving a first shaft and a steam engine which is connected to the first shaft by means of a clutch arrangement for driving a second shaft. Furthermore, means which interact with the clutch arrangement are arranged between the first shaft and the second shaft in order to transmit a rotary movement of the second shaft to the first shaft in a first operating mode and to allow a freewheel between the first shaft and the second shaft in a second operating mode.

The field of application of the present invention extends to a drive technology for motor vehicles, in particular a drive technology which includes an internal combustion engine and a steam engine for supporting the internal combustion engine.

The reduction of fuel consumption is of major importance in the development of internal combustion engines. Internal combustion engines convert a portion of the chemical energy of the fuel into mechanical energy for the purpose of driving motor vehicles. In the process, a large portion of the chemical energy is released as waste heat which is discharged in an unused state by the cooling system or in the exhaust gas of the internal combustion engine. In order to use this thermal energy, it is conceivable for the internal combustion engine to be coupled to a steam engine. In so doing, the thermal energy from the internal combustion engine is used to generate steam which is expanded in an expansion machine and consequently provides further energy which can be used to the drive the vehicle.

In particular, a combination of an internal combustion engine with a steam engine is suited for waste heat utilization in a commercial vehicle. This results from the fact that the internal combustion engine has to deliver a great deal of power in this case, and therefore a large amount of thermal energy is available for generating steam.

On the basis of the generally know prior art, it has been shown that the connection of the steam engine to the internal combustion is possible via a rigid coupling. In this way, the internal combustion engine already carries along the steam engine from the start-up of the former although there is still not a sufficient amount of steam pressure available for the steam engine. As a result, the disadvantage arises that the efficiency of the total system is reduced commensurate with the friction of the steam engine especially during start-up of the internal combustion engine and as long as said internal combustion engine only moderately generates heat.

It is furthermore known that the steam engine and the internal combustion engine are connected to one another via an intermediate free-wheel coupling. As a result, the internal combustion engine can rotate freely if there is not a sufficient amount of steam pressure available for the steam engine. In this case, the internal combustion engine does not have to overcome the additional friction of the steam engine. The disadvantage of this solution is that the combustion engine no longer carries the steam engine along, whereby the steam engine can possibly no longer independently start up due to the unfavorable standstill position thereof.

The German patent application DE 10 2010 031 498 A1 discloses an electromagnetic clutch which connects a steam engine to an internal combustion engine. In this case, a first shaft can be driven by the steam engine and a second shaft by the internal combustion engine. In addition an intermediate wheel is connected to the first shaft and a clutch bell is connected at least indirectly to the second shaft, wherein a free wheel is disposed between the intermediate wheel and clutch bell. The free wheel performs the task of transmitting the rotary movement of the intermediate wheel that is connected to the first shaft to the clutch bell and further of enabling a freewheel of the clutch with respect to the intermediate wheel. A frictional force or a form fit can be generated at least indirectly between the intermediate wheel and the clutch bell by means of an electromagnetic actuating force which is released by activating an electromagnet by means of a controller.

SUMMARY OF THE INVENTION

On the basis of the previously mentioned prior art, it is the aim of the present invention to provide a prime mover arrangement in which an internal combustion engine and a steam engine can be easily connected to one another in terms of drive technology via means and can be separated from one another at any time.

According to the invention, the clutch arrangement can be operated with positive or negative pressure, wherein the clutch arrangement can be shifted by a fluid and a torque transmission is implemented between the first shaft and the second shaft. The means between the first shaft and the second shaft is a multi-disk clutch comprising at least two clutch linings that are toothed on the outer periphery and at least one intermediate plate that is arranged axially between the at least two clutch linings and is toothed on the inner periphery, wherein the multi-disk clutch can be compressed in order to connect the first shaft and the second shaft in a frictionally engaged or positively engaged manner.

According to one measure which further improves the invention, it is proposed that the multi-disk clutch is arranged radially between a toothed inner periphery of a flange designed as an annular surface and a toothed outer periphery of the counter ring designed as an annular surface.

The at least two clutch linings that are toothed on the outer periphery thereof are connected in a positive-locking manner to an inner periphery of a flange and thus carry out the movement of the flange. The at least one intermediate plate that is toothed on the outer periphery thereof is connected in a positive-locking manner to the outer periphery of the counter ring and carries out the movement of the counter ring. The at least two clutch linings are therefore affected by the movement of the first shaft and the at least one intermediate plate is affected by the movement of the second shaft.

It is furthermore proposed that a counter ring which can be fitted onto the second shaft and a ring cylinder which can be mounted on the second shaft and is located between the counter ring and the shaft shoulder are fastened to the end face of the shaft shoulder of the second shaft with the aid of means for the axial and rotatory fixation thereof; thus enabling the rotary movement of the second shaft to be transmitted to the counter ring and the ring cylinder.

In a preferred manner, such means can be screws or pins. It is however also conceivable to introduce a groove into the second shaft in order to secure the counter ring and the ring cylinder against twisting. Said counter ring and ring cylinder can be secured in a preferable manner by means of a shaft ring or a shaft nut.

Furthermore, the clutch arrangement can preferably be operated with positive pressure or negative pressure, wherein the multi-disk clutch can be compressed in order to connect the first shaft and the second shaft to one another in a frictionally engaged or positively engaged manner. At the height of the two clutch linings, a thrust ring is preferably disposed on the end face of one of the at least two clutch linings, which thrust ring can be displaced axially in the direction of the at least two clutch linings by means of a piston that lies against the opposite end face of the thrust ring. As a result, an axial displacement of the thrust ring can be carried out by a fluid of one of the channels introduced into the ring cylinder.

The hydraulic or pneumatic actuation of the clutch ensures a reliable and simple actuation option. In a non-compressed state of the multi-disk clutch, the internal combustion engine can start up without the additional resistance of the steam engine and does not have to carry said steam engine along because the multi-disk clutch provides for a freewheel. As soon as sufficient steam is available to operate the steam engine, the clutch arrangement that can be actuated with fluid is closed, whereby the multi-disk clutch is compressed and the steam engine is tow-started. By means of the drive connection between the two shafts, the steam engine can relieve the internal combustion engine; thus enabling the degree of efficiency of the system to increase and therefore the fuel consumption to decrease.

According to a second exemplary embodiment, at least one spring is preferably disposed axially between the end face of the thrust ring and the end face of the ring cylinder, wherein the at least one spring compresses the at least two clutch linings and the at least one intermediate plate via the thrust ring and implements a frictional engagement.

In this case, the multi-disk clutch is closed without the applied pneumatic or hydraulic pressure. The multi-disk clutch is therefore compressed by the spring force acting thereupon. Due to the frictional or positive-locking connection between the at least two clutch linings and the at least one intermediate plate, the first and the second shaft have a reliable connection in terms of drive technology.

The invention includes the technical teaching that the thrust ring comprises a receiving area on the outer periphery thereof in order to receive at least one end section of a release lever that is disposed radially above said thrust ring, rests against the receiving area and points towards the shaft axis. In a further preferred manner, a clutch piston is disposed in a housing of the steam engine at the height of the end section of the release lever that points away from the shaft axis, said clutch piston comprises an annular piston which acts on a thrust ring.

It is furthermore proposed that a channel arranged on the annular piston carriers a fluid, wherein subjecting the fluid to pressure moves the annular piston axially and thereby actuates the end section of the release lever that points away from the shaft axis via a collecting ring disposed between the release lever and the clutch piston. The release lever is preferably mounted between the two end sections thereof so that an application of a force on the end section of the release lever pointing away from the shaft axis actuates the end section of the release lever pointing towards the shaft axis in the opposite direction via a lever action. In so doing, said release lever removes the thrust ring against a spring force of the at least one spring from one of the at least two clutch linings.

The advantage of such an arrangement is that the internal combustion engine can be separated during the warm-up phase from the steam engine by subjecting the clutch piston to pressure. As soon as a sufficient amount of steam is available to the steam engine, the piston is no longer subjected to pressure and the multi-disk clutch is closed again by means of the spring force. In a first step, the steam engine can be tow-started in order to subsequently supply a positive torque contribution to the first shaft that is connected to the second shaft. The collecting ring ensures the contact to the clutch piston and enables a smooth motion of the release lever.

Further measures for improving the invention are depicted below in detail with the aid of the drawings in conjunction with the description of the preferred exemplary embodiments.

BRIEF DESCRIPTION OF THE DRAWINGS

In the drawings:

FIG. 1 shows a schematic cross-sectional depiction of a prime mover arrangement comprising an internal combustion engine and a steam engine, which are connected to one another via a fluid-actuated clutch arrangement;

FIG. 2 shows an enlarged schematic cross-sectional depiction of the fluid-actuated clutch arrangement depicted in FIG. 1 according to a first exemplary embodiment; and FIG. 3 shows a schematic cross-sectional depiction of the fluid-actuated clutch arrangement depicted in FIG. 2 according to a second exemplary embodiment.

DETAILED DESCRIPTION

FIG. 1 shows a prime mover arrangement comprising an internal combustion engine 1 and a steam engine 4 which are connected to one another via a fluid-actuated clutch arrangement 3. The fluid-actuated clutch arrangement 3 is mounted between the steam engine 4 and the combustion engine 1. The combustion engine 1 has four cylinders 1a, 1b, 1c, 1d. In addition, the steam engine 4 has two cylinders 4a, 4b arranged opposite one another. The cylinders 4a, 4b of the steam engine 4 act on a second shaft 5 which can be driven by the steam engine 4. The cylinders 1a to 1d act on a first shaft 2 which can be driven by the internal combustion engine 1. Because the fluid-actuated clutch arrangement 3 comprises the first shaft 2 and the second shaft 5, a compact embodiment of the power mover arrangement results. Provision is furthermore made for holding arms 27 which connect a housing 20 of the steam engine 4 to a motor block of the internal combustion engine 1.

FIG. 2 is an enlarged depiction of the clutch arrangement 3. The second shaft 5 is mounted by means of a bearing 25a to a housing 20 of the steam engine 4, and a flange 11 on the internal combustion engine side is additionally mounted on the second shaft 5 via a bearing 25b. A counter ring 9 which can be fitted onto the second shaft 5 and a ring cylinder 10 which is located between the counter ring 9 and the shaft shoulder and can be fitted onto the second shaft 5 are fastened to the end face of the shaft shoulder of the second shaft 5 by screws 26; thus enabling the rotary movement of the second shaft 5 to be transmitted to the counter ring 9 and the ring cylinder 10. A multi-disk clutch 6 is formed from two clutch linings 7 which are toothed on an outer periphery thereof and an intermediate plate 8 which lies between said clutch linings and is toothed on an inner periphery thereof, wherein the multi-disk clutch 6 is disposed between a toothed inner periphery of the flange 11 designed as an annular surface and a toothed outer periphery of the counter ring 9 designed as an annular surface.

A thrust ring 12 is disposed on the end face of one of the two clutch linings 7 at the height of the two clutch linings 7. The thrust ring 12 can be displaced in the direction of the two clutch linings 7 by a piston 13 resting against on the opposite end face, wherein a displacement is carried out by a fluid of a channel 14 introduced into the ring cylinder 10. By actuating the multi-disk clutch 6, a frictional engagement occurs between the clutch linings 7 on the one side and the counter ring 9, the intermediate plate 8 and the thrust ring 12 on the other side. The frictional engagement between the first shaft 2 that is connected to the flange 11 and the second shaft 5 is made and the steam engine 4 is initially tow-started by the combustion engine 1 in order to then transmit the torque thereof to said steam engine.

FIG. 3 shows a further preferred embodiment of the clutch arrangement 3 according to the invention, wherein the multi-disk clutch 6 from FIG. 3 is compressed in this embodiment without pneumatic or hydraulic pressure being applied. At the height of the two clutch linings 7, a thrust ring 12 is disposed on the end face of one of the two clutch linings 7, which thrust ring is subjected to a spring force by means of springs disposed between the end face of the thrust ring 12 and the end face of the ring cylinder 10; thus enabling the two clutch linings 7 and the intermediate plate 8 to enter into a frictional contact. The thrust ring 12 has a receiving area 16 on an outer periphery in order to receive at least one release lever 18 disposed above said thrust ring and resting against the receiving area 16. The release lever 18 can be actuated by a clutch piston 19, which is seated in the housing 20 and comprises an annular piston 22 that acts on a thrust ring 21, via a collecting ring 24 on a side opposite the thrust ring 12. The thrust ring 12 is removed via a lever action of the release lever 18 from one of the two clutch linings 7 against the spring force of the springs 15. In order to release the multi-disk clutch 6, the clutch piston 19 is subjected to pressure from the channel 23 arranged in the housing 20, which leads to the unloading of the multi-disk clutch 6 and thus to the interruption of the frictional engagement.

The invention is not limited to the preferred exemplary embodiment described above. In fact, modifications to said embodiment are also conceivable which are included in the range of protection of the subsequent claims. Thus, it is, for example, also possible to dispose the steam engine 4 on the side of the internal combustion engine 1 and to connect up a transmission via toothed drive belts and gear wheels. In addition, a positive-locking connection between the end faces of the two clutch linings and the end face of the intermediate plate is possible by means of structuring said end faces of the clutch linings and that of the intermediate plate. The multi-disk clutch 6 can furthermore have a more compact design in the case of small torques so that the intermediate plate 8 and one of the at least two clutch linings 7 can be omitted. In this case, the thrust ring 12 would press against the single clutch lining 7, which is interlocked with the flange 11, when said thrust ring 12 is axially displaced. As a result, a frictional engagement results between the clutch lining 7 and the counter ring 9 on the one side and between said clutch lining 7 and the thrust ring 12 on the other side.

It should be further noted that the term "comprising" does not exclude any other elements or steps and the term "one" does not exclude any plurality of elements or steps. It should also be further noted that features or steps which are described in reference to one of the exemplary embodiments described above can also be used in combination with other features or steps of other exemplary embodiments described above. Reference signs in the claims are not to be considered as limiting factors.

What is claimed is:

1. A prime mover arrangement comprising an internal combustion engine (1) for driving a first shaft (2) and a steam engine (4) for driving a second shaft (5), wherein a clutch arrangement (3) is arranged between the first shaft (2) and the second shaft (5) in order to transmit a rotary movement of the second shaft (5) to the first shaft (2) in a first operating mode and to allow a freewheel between the first shaft (2) and the second shaft (5) in a second operating mode, characterized in that the clutch arrangement (3) is configured to be operated with positive pressure or negative pressure, wherein the clutch arrangement (3) is configured to be shifted by a fluid to transmit torque between the first shaft (2) and the second shaft (5), wherein the clutch arrangement (3) includes a multi-disk clutch (6) having at least two clutch linings (7) that are toothed on an outer periphery and at least one intermediate plate (8) that is disposed axially between the at least two clutch linings (7) and is toothed on an inner periphery, wherein the multi-disk clutch is configured to be compressed in order to connect the first shaft (2) and the second shaft (5) to one another in a frictionally engaged or positively engaged manner, wherein a counter ring (9) that is configured to be fitted onto the second shaft (5) and a ring cylinder (10) that is located axially between the counter ring (9) and a shaft shoulder of the second shaft (5) and is configured to be fitted onto the second shaft (5) are axially and rotatably fastened to an end face of the shaft shoulder of the second shaft (5), thus enabling the rotary movement of the second shaft (5) to be transmitted to the counter ring (9) and the ring cylinder (10), and wherein one end face of a thrust ring (12) is disposed adjacent an end face of one of the at least two clutch linings (7), wherein the thrust ring (12) is configured to be displaced by a piston (13) resting against an opposite end face of said thrust ring (12) in a direction of the at least two clutch linings (7), wherein an axial displacement of said thrust ring (12) is configured to be carried out by a fluid of a channel (14) introduced into the ring cylinder (10).

2. The prime mover arrangement according to claim 1, characterized in that the multi-disk clutch (6) is disposed radially between a toothed inner periphery of a flange (11), which is designed as an annular surface, and a toothed outer periphery of the counter ring (9), which is designed as an annular surface.

3. A prime mover arrangement comprising an internal combustion engine (1) for driving a first shaft (2) and a steam engine (4) for driving a second shaft (5), wherein a clutch arrangement (3) is arranged between the first shaft (2) and the second shaft (5) in order to transmit a rotary movement of the second shaft (5) to the first shaft (2) in a first operating mode and to allow a freewheel between the first shaft (2) and the second shaft (5) in a second operating mode, wherein the clutch arrangement (3) is configured to be operated with positive pressure or negative pressure, wherein the clutch arrangement (3) is configured to be shifted by a fluid to transmit torque between the first shaft (2) and the second shaft (5), wherein the clutch arrangement (3) includes a multi-disk clutch (6) having at least two clutch linings (7) that are toothed on an outer periphery and at least one intermediate plate (8) that is disposed axially between the at least two clutch linings (7) and is toothed on an inner periphery, wherein the multi-disk clutch is configured to be compressed in order to connect the first shaft (2) and the second shaft (5) to one another in a frictionally engaged or positively engaged manner, wherein a counter ring (9) that is configured to be fitted onto the second shaft (5) and a ring cylinder (10) that is located axially between the counter ring (9) and a shaft shoulder of the second shaft (5) and is configured to be fitted onto the second shaft (5) are axially and rotatably fastened to an end face of the shaft shoulder of the second shaft (5), thus enabling the rotary movement of the second shaft (5) to be transmitted to the counter ring (9) and the ring cylinder (10), wherein at least one spring (15) is disposed axially between an end face of a thrust ring (12) and an end face of the ring cylinder (10), and wherein the at least one spring (15) compresses the at least two clutch linings (7) and the at least one intermediate plate (8) via the thrust ring (12).

4. The prime mover arrangement according to claim 3, characterized in that the thrust ring (12) has a receiving area (16) on an outer periphery thereof in order to receive at least one end section of a release lever (18) which is disposed radially above said thrust ring, rests against the receiving area (16) and points to a shaft axis (17).

5. The prime mover arrangement according to claim 4, characterized in that a clutch piston (19) is disposed in a housing (20) of the steam engine (4) at the height of the end section of the release lever (18) which points away from the shaft axis (17), said clutch piston comprising an annular piston (22) that acts on the thrust ring (21).

6. The prime mover arrangement according to claim 5, characterized in that a channel (23) arranged in the housing (20) carries a fluid, wherein subjecting the fluid to pressure moves the annular piston (22) in an axial direction and thereby actuates the end section of the release lever (18) that points away from the shaft axis (17) via a collecting ring (24) disposed between the release lever (18) and the clutch piston (19).

7. The prime mover arrangement according to claim 6, characterized in that the release lever (18) is mounted between the end sections thereof so that an application of a force on the end section of the release lever (18) pointing away from the shaft axis (17) actuates the end section of the release lever (18) pointing towards the shaft axis (17) in the opposite direction via a lever action, wherein said release lever removes the thrust ring (12) from one of the at least two clutch linings (7) against a spring force of the at least one spring (15).

8. A prime mover arrangement comprising an internal combustion engine (1) for driving a first shaft (2) and a steam engine (4) for driving a second shaft (5), wherein a clutch arrangement (3) is arranged between the first shaft (2) and the second shaft (5) in order to transmit a rotary movement of the second shaft (5) to the first shaft (2) in a first operating mode and to allow a freewheel between the first shaft (2) and the second shaft (5) in a second operating mode, wherein the clutch arrangement (3) is configured to be operated with positive pressure or negative pressure, wherein the clutch arrangement (3) is configured to be shifted by a fluid to transmit torque between the first shaft (2) and the second shaft (5), wherein the clutch arrangement (3) includes a multi-disk clutch (6) having at least two clutch linings (7) that are toothed on an outer periphery and at least one intermediate plate (8) that is disposed axially between the at least two clutch linings (7) and is toothed on an inner periphery, wherein the multi-disk clutch is configured to be compressed in order to connect the first shaft (2) and the second shaft (5) to one another in a frictionally engaged or positively engaged manner, wherein a counter ring (9) that is configured to be fitted onto the second shaft (5) and a ring cylinder (10) that is located axially between the counter ring (9) and a shaft shoulder of the second shaft (5) and is configured to be fitted onto the second shaft (5) are axially and rotatably fastened to an end face of the shaft shoulder of the second shaft (5), thus enabling the rotary movement of the second shaft (5) to be transmitted to the counter ring (9) and the ring cylinder (10), wherein a thrust ring (12) has a receiving area (16) on an outer periphery thereof in order to receive at least one end section of a release lever (18) which is disposed radially above said thrust ring (12), rests against the receiving area (16) and points to a shaft axis (17).

9. The prime mover arrangement according to claim 7, characterized in that a clutch piston (19) is disposed in a housing (20) of the steam engine (4) at the height of the end section of the release lever (18) which points away from the shaft axis (17), said clutch piston (19) comprising an annular piston (22) that acts on the thrust ring (12).

10. The prime mover arrangement according to claim 9, characterized in that a channel (23) arranged in the housing (20) carries a fluid, wherein subjecting the fluid to pressure moves the annular piston (22) in an axial direction and thereby actuates the end section of the release lever (18) that points away from the shaft axis (17) via a collecting ring (24) disposed between the release lever (18) and the clutch piston (19).

11. The prime mover arrangement according to claim 10, characterized in that the release lever (18) is mounted between the end sections thereof so that an application of a force on the end section of the release lever (18) pointing away from the shaft axis (17) actuates the end section of the release lever (18) pointing towards the shaft axis (17) in the opposite direction via a lever action, wherein said release lever removes the thrust ring (12) from one of the at least two clutch linings (7) against a spring force of the at least one spring (15).

* * * * *